United States Patent Office 2,734,083
Patented Feb. 7, 1956

2,734,083

PREPARATION OF N,N-DIALLYL UREA

Jerry Peter Milionis, Stamford, and Pierrepont Adams, Darien, Conn., assignors to American Cyanamid Company, New York, N. Y., a corporation of Maine No Drawing. Application February 17, 1955, Serial No. 488,998

2 Claims. (Cl. 260—553)

The present invention relates to a disubstituted urea and particularly is directed to N,N-diallylurea and to methods for preparing the same.

The disubstituted urea of the invention is useful in resin chemistry. It also finds utility as an intermediate in the preparation of N,N-diallyl-N'-methylolurea. The latter may be employed as a textile treating agent, imparting to cloth crease-resistant properties.

N,N-diallylurea may be prepared by reacting a diallylamine hydrohalide and an alkali metal cyanate in equimolar proportions in accordance with the equation:

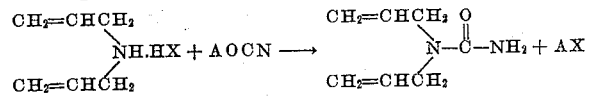

where A is sodium or potassium and X is fluorine, chlorine, bromine or iodine. The reaction may be carried out from about 20° C. to about 35° C.

Alternatively, N,N-diallylurea can be conveniently prepared by hydrolyzing diallylcyanamide in an acid menstruum according to the equation:

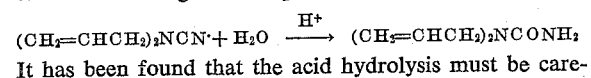

It has been found that the acid hydrolysis must be carefully controlled to prepare the desired urea derivative. For instance, if the hydrolysis is permitted to proceed for more than one hour, little, if any, N,N-diallylurea can be obtained. Preferably, the hydrolysis of diallylcyanamide should be conducted at a temperature within the range of about 50° C. to 100° C. The acid menstruum includes sulfuric, hydrochloric, nitric or phosphoric acid.

The invention will be more clearly understood by the following illustrative examples. Unless otherwise noted, the parts given are by weight.

Example 1

140.5 parts of diallylamine was added slowly to a mixture of 150 parts of 37% hydrochloric acid and 150 parts water. A solution of 125 parts of potassium cyanate in 150 parts of water was then added. The temperature was maintained between 25° C. and 35° C. Two liquid phases formed. The lower layer was the water phase and the upper was the phase containing the reaction mixture. The water phase was discarded and the organic phase was allowed to stand for twelve hours at room temperature, i. e., between 20°-25° C. On cooling the mixture to about 5° C., crystals of N,N-diallylurea formed rapidly. These were filtered and dried in a vacuum desiccator over sulfuric acid. The dried product was dissolved in ethyl alcohol, filtered to remove impurities, such as potassium chloride, and the filtrate was evaporated to dryness. The crude white residue, N,N-diallylurea, was then dried in a vacuum desiccator. The product melted at 62°-64° C., and a yield of 83.7 was obtained.

In this example, the hydrobromide or hydroiodide salt can be substituted for the hydrochloride salt of diallylamine with similar results. Also sodium cyanate can replace the potassium cyanate of the example with resultant N,N-diallylurea formation.

Example 2

244 parts of diallylcyanamide (2 mols) was added to 200 parts of 98.6% sulfuric acid (2.1 mols) and 190 parts of water at such a rate that the temperature was maintained between 93° C. and 97° C. The addition was completed in fourteen minutes. The reaction mixture was allowed to cool slowly to 78° C. in five minutes and then was quickly cooled within a minute to about 10° C. Thereafter, the reaction mixture was neutralized with 32.7% sodium hydroxide solution while maintaining the temperature of the mixture between about 20° C. and 30° C. Crystals formed during the neutralization. These were filtered off and air-dried. The filtrate was again cooled to 5° C., whereupon additional crystals precipitated out. These were then separated from the filtrate and combined with the crystals formed as a result of the neutralization step. The crude product was then extracted with toluene at 45° C. When the toluene solution was cooled to 10° C., 167 parts (82.7% yield) of N,N-diallylurea was obtained as a precipitate which was removed by filtration. The product melted at 67.5°–68° C.

While sulfuric acid is employed as the acid menstruum, hydrochloric acid or phosphoric acid may be substituted with similar effect.

Example 3

This example illustrates the use of N,N-diallylurea as an intermediate in the preparation of N,N-diallyl-N'-methylolurea which is a textile treating agent.

70 parts of N,N-diallylurea (0.5 mol) was dissolved in 100 parts of water. A 20% sodium hydroxide solution was added to adjust the pH of the solution to about 7.5. Eighty-one parts (1.0 mol) of 37% methanol-free formaldehyde was added. The solution was heated for six hours at 70° C. and then cooled to room temperature (25° C.) to obtain a resinous solution containing N,N-diallyl-N'-methylolurea. A piece of cottom fabric was submerged in a tank containing a ten percent aqueous solution of the latter compound. The fabric was withdrawn and squeezed dry by passing it through a roller. The fabric showed less than one and one-half percent shrinkage and improved crease-resistant properties.

We claim:

1. The method for the preparation of N,N-diallylurea which comprises the steps of: subjecting diallylcyanamide to mineral acid hydrolysis at temperatures between about 50° C. and 100° C. for a period not exceeding one hour; and recovering the thus-formed N,N-diallylurea.

2. The method according to claim 1 in which the mineral acid is sulfuric acid.

References Cited in the file of this patent

UNITED STATES PATENTS

| | | |
|---|---|---|
| 2,374,485 | Haury | Apr. 24, 1945 |
| 2,477,872 | Haury | Aug. 2, 1949 |